United States Patent [19]

Sinclair

[11] Patent Number: 4,733,791
[45] Date of Patent: Mar. 29, 1988

[54] REPLACEMENT FILL PIPE RESTRICTOR

[76] Inventor: Karl F. Sinclair, 516 Sechkalou Dr. Ste. 106, Vancouver, Wash. 98668

[21] Appl. No.: 904,967

[22] Filed: Sep. 8, 1986

[51] Int. Cl.$^4$ .............................................. B67D 5/04
[52] U.S. Cl. ................................... 220/86 R; 141/1; 220/85 F
[58] Field of Search ............ 137/1, 234.6, 351, 513.3, 137/843, 851, 852, 855, 857; 138/37, 40, 103, 178; 141/1, 348, 389, 392; 220/1 V, 85 F, 85 VR, 85 VS, 86 R, 86 AT, DIG. 33; 98/122

[56] References Cited

U.S. PATENT DOCUMENTS

| 641,028 | 1/1900 | Meehan | 98/122 |
|---|---|---|---|
| 721,853 | 3/1903 | Bauer | 98/122 X |
| 1,280,047 | 9/1918 | Kurtz | 98/122 X |
| 3,979,010 | 9/1976 | Fiedler et al. | 220/86 R |
| 4,248,279 | 2/1981 | Warmbold | 141/348 |
| 4,529,097 | 7/1985 | Larson | 220/86 R |
| 4,560,084 | 12/1985 | Wolfson | 220/200 X |

Primary Examiner—Charles E. Phillips
Assistant Examiner—Mark J. Thronson
Attorney, Agent, or Firm—Robert L. Harrington

[57] ABSTRACT

A restrictor adapted to replace missing restrictors of fill pipes of automobile fuel tanks. A containment ring with a reduced center opening (large enough for unleaded fuel nozzles and too small for leaded fuel nozzles) and an outer diameter smaller than the inner diameter of the fill pipe. A spring biased flap or cover, closes the center opening. Bendable tabs extend from the periphery of the ring. The tabs are bent forwardly away from the side of the flap, and the restrictor is inserted into the fill pipe at the designated position. One of the tabs is clamped against the fill pipe wall while the others are rebent into a configuration to engage the fill pipe wall. The tabs are fastened to the wall by an adhesive, soldering or welding. Soldering may be achieved by pretinning of the tab ends.

4 Claims, 4 Drawing Figures

REPLACEMENT FILL PIPE RESTRICTOR

FIELD OF INVENTION

This invention relates to restrictors provided in fuel pipes of automobile fuel tank, and more specifically to a replacement unit that replaces restrictors originally provided and subsequently removed.

BACKGROUND OF THE INVENTION

It is well known that leaded gasoline is a major cause of air pollution which is being combatted in part by requiring newer cars to operate on unleaded gasoline. Whereas older cars still require leaded gasoline, service stations routinely provide both leaded and unleaded gasoline to service both the newer and older cars.

Leaded gasoline is generally cheaper to buy than unleaded gasoline. Also many people feel that their automobile operates better on leaded gasoline. Thus a significant percentage of the people driving the newer cars, if given a choice, will purchase leaded gasoline. To prevent this violation of the Air Pollution Act, a Federal Mandate was devised to force new car owners to purchase unleaded gasoline only.

The Mandate provides that retailers of gasoline use two specifically sized gas pump nozzles, the nozzle for leaded gas being larger than the nozzle for unleaded gas. A second part of the Mandate requires manufacturers to provide the gas tank fill pipes of the newer cars being manufactured with restrictors that will prevent the use of the larger nozzle for pumping gas through that fill pipe into the car's fuel tank.

The restrictor is in effect a secondary spring loaded gas cap that fits inside the fill pipe. The cap is opened by forcing the smaller nozzle through a restricted opening. The nozzle engages and pushes open the spring loaded cap. The gasoline can then be freely pumped through the fill pipe. The larger nozzle will not fit through the restricted opening and thus the cap cannot be pushed open for filling with the leaded gasoline.

A small but significant percentage of new car owners get around these requirements by removing the restrictor in the fill pipe, e.g., with a long chisel type tool and a hammer that is applied to break loose the fasteners securing the restrictor in the fill pipe. However, registration of automobiles often require pollution checks, (notably in metropolitan areas) and one of these checks is for the restrictor in the fill pipe. Without the restrictor the car cannot be registered. Replacing the restrictor has heretofore been a very expensive proposition, e.g., requiring replacement of the fill pipe or even the entire fuel tank.

Whereas the unscrupulous get their just desserts so to speak, a very large percentage of those caught in this dilemma are innocent second party purchasers of the automobile.

THE PRESENT INVENTION

The present invention solves the above problem with a restrictor specifically designed to easily, quickly and inexpensively fit in and attach to the fill pipe. It functions to prevent the use of the larger leaded gas nozzle and thus effectively replaces the original restrictor. Briefly, the preferred embodiment of the invention is a washer like flat ring portion having an outside diameter that "loosely" fits the inside diameter of the fill pipe. The inside diameter (the hole of the washer) is smaller than the leaded gas nozzle and larger than the unleaded gas nozzle. The ring is fitted with a spring biased flap or cover that closes the opening. Fasteners are provided at the outer rim of the ring for fastening the ring to the inside wall of the fill pipe. The fasteners are adaptable for fill pipes of similar but different sizes and can be readily applied by a mechanic to secure the restrictor device in place.

The invention will be more clearly understood by reference to the following detailed description and the drawings attached hereto including:

Figure 4:
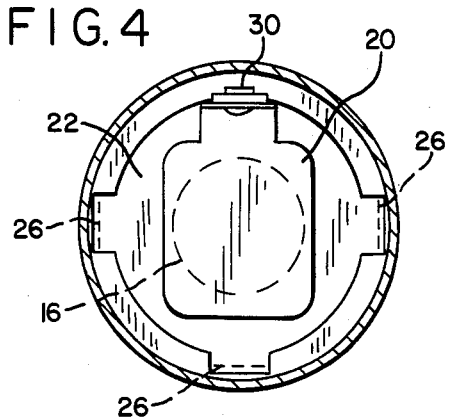
FIG. 4 is a view taken on view lines 4—4 of FIG. 3.

Referring first to FIG. 4 of the drawings, the mandated process for preventing the "fill-up" of fuel tanks with leaded gas is illustrated. A restrictor 10 is attached to the inside wall of a fill pipe 12, a short distance (e.g. 3 to 6 inches) inwardly from the mount 14 of the fill pipe. The restrictor 10 has a reduced center opening 16 that is large enough to accommodate a nozzle 18 (in dash lines) but not the larger nozzle used to pump leaded gas. A spring loaded flap 20 effectively closed opening 16 and is opened by protrusion of the nozzle 16 as illustrated in dash lines. The larger leaded gas pumping nozzle although fitting through opening 14, will not fit through opening 16. Thus the flap 20 will remain closed over opening 16 and any attempt to pump gas through the fill pipe will result in backup and spilling of the gas back through opening 14. Whereas a small trickle of gas will leak around the restrictor 10 and on into the fuel tank, the difficulty factor in doing so for any significant quantity of the gas, far outweighs the perceived benefit to the car owner and thus the restrictor quite effectively accomplishes it's objective, i.e., to deter use of leaded gas in cars designated for unleaded gas only.

Figure 1:
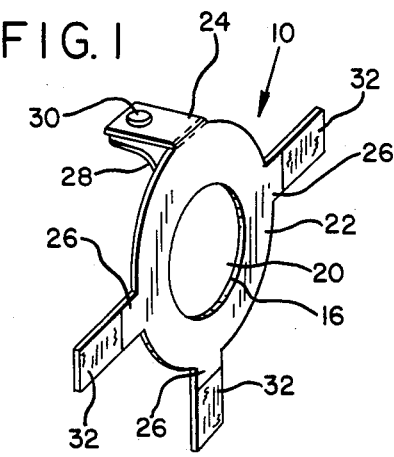
FIG. 1 is a perspective view of a replacement fill pipe restrictor in accordance with the present invention.

Reference is now made to FIG. 1 which illustrates a preferred restrictor of the present invention and the configuration it is in when purchased, i.e. "off the shelf". A flat metal ring portion 22, e.g., of 16 gauge cold rolled steel, has a center opening 16 and four radially extended fastener tabs. One of the tabs is designated as a flap fastener tab 24 and the other three tabs are designated as fill pipe fastening tabs 26.

Figure 3:
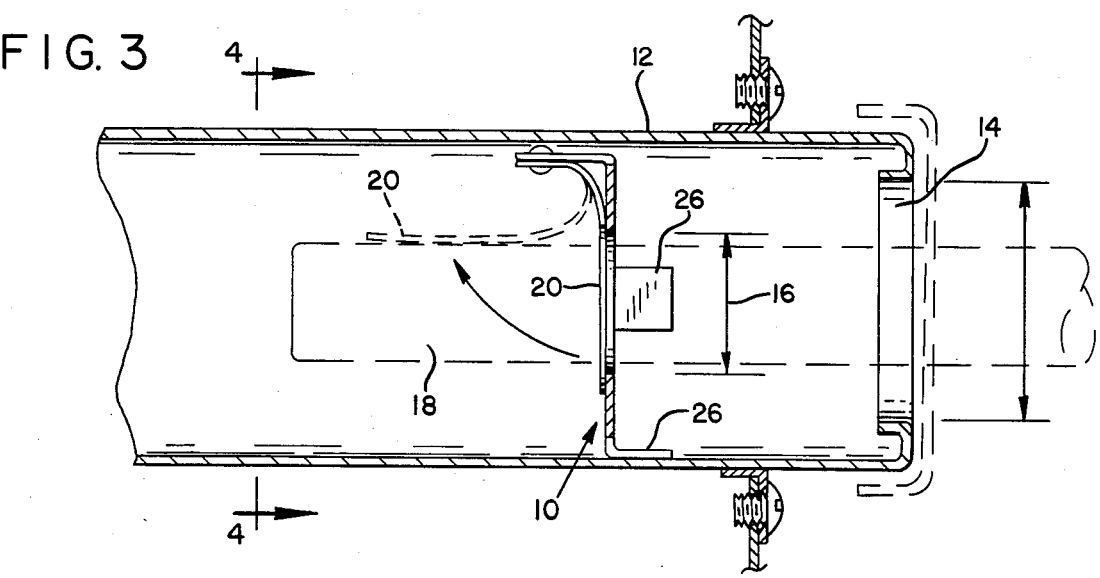
FIG. 3 is a cross sectional view of a gas tank fill pipe with the restrictor of FIG. 1 fastened in place in the fill pipe.

The flap 20 (refer also to FIGS. 3 and 4) is a thin flat metal plate having an integral tab portion 28 that is resiliently bendable. As seen in the figures, the tab 28 is bowed by abutting the flap 20 against the opening 16, and bending the end portion of tab 28 back under tab 24 of the ring, and in this juxtaposed position, it is riveted (by rivet 30) to the tab 24. The resiliency of the tab 28 maintains a consistent urging of the flap 20 against the opening 16. However, thus urging can be physically overcome which is accomplished when the flap is pushed open by the nozzle 18 as previously described. The resiliency of the tab 28 returns the flap to it's closed position when the nozzle is removed.

The fastening of the restrictor 10 to the inside wall of the fill pipe 12 is preferably accomplished by soldering or by adhering with a suitable adhesive. In FIG. 1, the coating 32 represents a solder coating. Such a coating is applied when the restrictor is manufactured and is referred to as pretinning. A satisfactory pretinning material is 50/50 solder. Adhesives in general are not satisfactory because gasoline tends to be destructive of adhesives. One adhesive that has been found satisfactory is JB Weld produced by the JB Weld Inc. of Sulfer Springs, Tex. The adhesive is preferred because soldering requires the application of heat and thus the fill pipe needs to be removed from the fuel tank. Soldering is thus recommended only for qualified mechanics. Adhesives, applied cold, do not have the safety problem but is also considered not as reliable as a fastener. Of course silver soldering or spot welding are also options, again however, only by a qualified mechanic.

INSTALLATION

A major benefit of the herein disclosed replacement restrictor 10, is that it can be installed in an existing fill pipe at a minimum of cost to the car owner. Also, it is adaptable to a range of fill pipe sizes and thus can be mass produced at still further reduced cost to the car owner.

Figure 2:
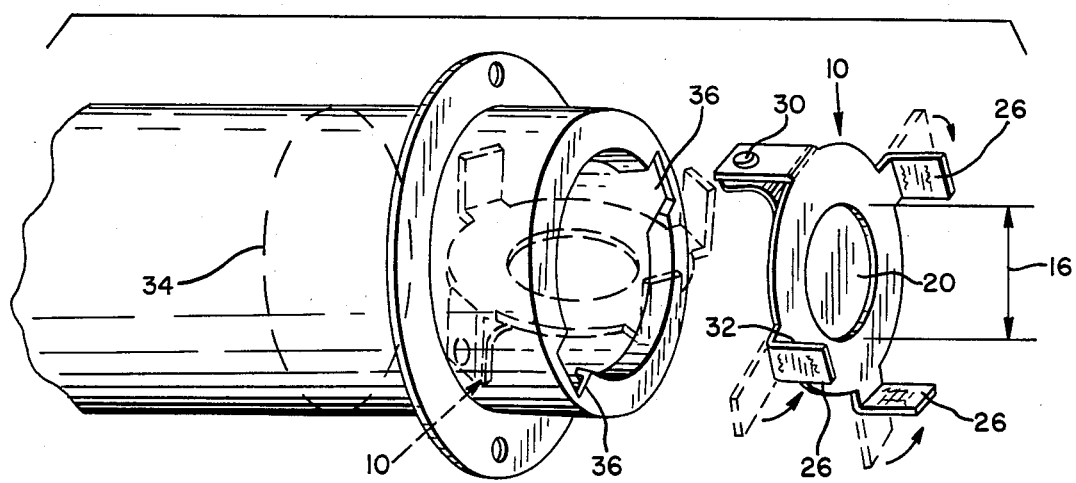
FIG. 2 is a perspective illustration of the method of interfitting the restrictor of FIG. 1 to a fill pipe.

As previously indicated, FIG. 1 illustrates the "off the shelf" configuration of the restrictor 10. The installer's first step is to determine the method of fastening, i.e., soldering, welding, adhesive etc. The present illustration presumes use of the soldering method and the tabs 26 are thus pretinned. Other methods require the tabs 26 to be free of the tinning material. The next step is to determine the approximate size of the fill pipe opening and to bend the tabs 26 to reduce the overall diameter of the restrictor to an appropriate size. The tabs are all bent in a direction opposite to the tab 28. (See FIG. 2 which shows the tabs 26 before bending in dash lines and after bending in solid lines.)

Next the installer determines the position in the fill pipe wherein he desires to locate the restricter. It is considered advisable to simply locate the restricter at the same position where the original restricter resided, such position being indicated in FIG. 2 by the circular dash line 34. (Note that residue of the prior fastening may require some precleaning of the fill pipe at that location).

Next the installer maneuvers the restrictor through the opening 40 which is commonly a reduced neck portion as compared to the inside diameter of the fill pipe. It has been found that in most cases the restrictor can be inserted through this opening by taking advantages of the cutouts 36 that accommodate the lock tabs of many gas caps. For example, note the lamb over position of the restrictor 10 (shown in dash lines in FIG. 2) in the process of being inserted through the reduced opening 14.

It should be appreciated however that fill pipes come in a lot of different configurations. in some cases, the restrictor is inserted to position 34 through the opposite end. Note here that in some gas tanks the fill pipe is integral with the gas tank and must be served and then reattached, e.g. by a rubber sleeve or the like. At any rate, most restrictors can be simply inserted through the mouth 14 and if not, there are a number of alternatives available to the innovative mechanic.

With the restrictor 10 uprighted at position 34, a C clamp is applied through the mouth 14 to clamp one of the tabs 26 tightly against the fill pipe wall. The ramaining tabs 26 are bent outwardly into contact with the fill pipe wall and heat is applied at that point on the outside of the wall. This melts the tinning 32 and effects soldering. The C clamp is then removed and heat is applied to it in the same manner. The restrictor is then effectively bonded to the pipe wall.

The process of attaching the untinned restrictor is similar. With the C clamp in place, the tabs 26 are silver soldered, braized or spot welded at the option of the qualified mechanic. A novice will apply the adhesive just before the restrictor is installed and then apply means for holding the tabs against the pipe wall until the adhesive sets. Whereas numerous variations will become apparent to those skilled in the art upon review of this disclosure, basically this invention is considered an insertible restrictor having a containment ring with a spring biased flap or cover, and multiple fastening tabs that can be adjusted, after positioning in the fill pipe, to accomodate placement of the restrictor and/or adjustment to various sizes of fill pipes. Thus such variations are intended to be encompassed by the inventive concept as defined in the appended Claims.

I claim:

1. A replacement restrictor for replacing fill pipe restrictors in fuel tanks within a designated size range of fill pipes comprising; a rigid ring having a center opening and an outer diameter smaller than the inside diameter of the designated size range of fill pipes, a spring biased flap connected to the rigid ring and covering the center opening, and multiple fastening tabs provided on the periphery of the ring and projected outwardly thereof, said tabs being adjustable outwardly of the periphery of the ring to adjust the dimension of the restrictor to the dimension of the inside wall of a selected fill pipe within the designated range of fill pipes, said outwardly projected tabs further determining the outer dimension of the replacement restrictor at a position spaced inwardly of the fill pipe inlet to inhibit removal of the replacement restrictor, and fastening means for fastening the tabs to the inside wall of the fill pipe.

2. A replacement restrictor as defined in claim 1 wherein the fastening means is a tinning material coated on the tabs for effectively solder fastening the tabs to the fill pipe wall upon the application of heat.

3. A replacement restrictor as defined in claim 1 wherein the tabs are bendable for adjustment outwardly toward the fill pipe wall.

4. A replacement restrictor as defined in claim 3 wherein a flap fastening tab is projected axially in the direction of the flap side of the ring, said spring biased flap having a tab resiliently bendable and permanently urging an alignend relationship with the flap, said tab being bent from the aligned position and fastened to the flap fastening tab to permanently urge the flap toward a position of closing the ring opening.

* * * * *

UNITED STATES PATENT AND TRADEMARK OFFICE
CERTIFICATE OF CORRECTION

PATENT NO. : 4,733,791
DATED : March 29, 1988
INVENTOR(S) : Karl F. Sinclair

It is certified that error appears in the above—identified patent and that said Letters Patent is hereby corrected as shown below:

Col. 4, lines 29 to 46 should read:

1. A replacement restrictor for replacing fill pipe restrictors in fuel tanks within a designated size range of fill pipes comprising; a rigid ring having a center opening and an outer diameter smaller than the inside diameter of the designated size range of fill pipes, a spring biased flap connected to the rigid ring and covering the center opening, and multiple fastening tabs provided on the periphery of the ring and projected outwardly thereof, said tabs being adjustable outwardly of the periphery of the ring to adjust the dimension of the restrictor to the dimension of the inside wall of a selected fill pipe within the designated range of fill pipes, said outwardly projected tabs further determining the outer dimension of the replacement restrictor at a position spaced inwardly of the fill pipe inlet to inhibit removal of the replacement restrictor, and fastening means for fastening the tabs to the inside wall of the fill pipe <u>at the inserted position</u>.

Col. 4, line 58, correct "alignend" to read --aligned--.

Signed and Sealed this

Twenty-sixth Day of July, 1988

Attest:

DONALD J. QUIGG

Attesting Officer      Commissioner of Patents and Trademarks